(12) United States Patent
Lu

(10) Patent No.: US 9,882,198 B2
(45) Date of Patent: Jan. 30, 2018

(54) HIGH PERFORMANCE LITHIUM BATTERY ELECTRODES BY SELF-ASSEMBLY PROCESSING

(71) Applicant: Wei Lu, Ann Arbor, MI (US)

(72) Inventor: Wei Lu, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 38 days.

(21) Appl. No.: 14/609,547

(22) Filed: Jan. 30, 2015

(65) Prior Publication Data

US 2015/0221929 A1   Aug. 6, 2015

Related U.S. Application Data

(60) Provisional application No. 61/935,526, filed on Feb. 4, 2014.

(51) Int. Cl.
| | | |
|---|---|---|
| H01M 4/04 | (2006.01) | |
| H01M 4/36 | (2006.01) | |
| H01M 4/131 | (2010.01) | |
| H01M 4/1391 | (2010.01) | |
| H01M 4/62 | (2006.01) | |
| H01M 10/052 | (2010.01) | |

(52) U.S. Cl.
CPC ......... *H01M 4/0404* (2013.01); *H01M 4/131* (2013.01); *H01M 4/1391* (2013.01); *H01M 4/364* (2013.01); *H01M 4/366* (2013.01); *H01M 4/624* (2013.01); *H01M 10/052* (2013.01); *Y10T 428/249921* (2015.04)

(58) Field of Classification Search
None
See application file for complete search history.

(56) References Cited

U.S. PATENT DOCUMENTS

| | | | |
|---|---|---|---|
| 2006/0222592 A1 | 10/2006 | Burda | |
| 2007/0218363 A1* | 9/2007 | Paulsen | C01G 51/42 429/231.3 |
| 2008/0093217 A1* | 4/2008 | Wu | G01N 21/658 204/450 |
| 2008/0224123 A1 | 9/2008 | Martin et al. | |

(Continued)

FOREIGN PATENT DOCUMENTS

| | | |
|---|---|---|
| EP | 2597707 A1 | 5/2013 |
| WO | 2010135446 A1 | 11/2010 |

(Continued)

OTHER PUBLICATIONS

Marom et al., "A review of advanced and practical lithium battery materials," J. Mater. Chem., 2011, 21, 9938.*

(Continued)

*Primary Examiner* — Lucas J. O'Donnell
(74) *Attorney, Agent, or Firm* — Quarles & Brady LLP

(57) ABSTRACT

Disclosed are methods and processes for producing electrochemical devices having well-organized nanostructures or microstructures. In one aspect, the present invention discloses a simple, cheap, and fast nanotechnology-based manufacturing process for fabricating high performance electrodes. The present processing technique is highly versatile and can be applied to diverse materials systems for anode and cathode electrodes.

7 Claims, 7 Drawing Sheets

(56) References Cited

U.S. PATENT DOCUMENTS

| | | | |
|---|---|---|---|
| 2009/0053512 A1* | 2/2009 | Pyun | G11B 5/712 428/336 |
| 2009/0214944 A1 | 8/2009 | Rojeski | |
| 2009/0253037 A1 | 10/2009 | Park et al. | |
| 2009/0305135 A1 | 12/2009 | Shi et al. | |
| 2009/0309063 A1* | 12/2009 | Paulsen | C01G 45/1228 252/182.33 |
| 2012/0219841 A1 | 8/2012 | Bolandi et al. | |
| 2012/0321959 A1 | 12/2012 | Yushin et al. | |
| 2013/0084464 A1 | 4/2013 | See et al. | |
| 2013/0316245 A1* | 11/2013 | Buchanan | H01M 4/0416 429/232 |

FOREIGN PATENT DOCUMENTS

| | | |
|---|---|---|
| WO | 2012105901 A1 | 8/2012 |
| WO | 2013052456 A1 | 4/2013 |

OTHER PUBLICATIONS

PCT Search Report and Written Opinion for PCT/US15/13653.
J. Park et al.; "Self-Assembly of Nanoparticles into Heterogeneous Structures with Gradient Material Properties"; 83 Physical Review 031402-1-031402-7 (2011).
Z. Zhao et al.; "Growing Large Nanostructured Superlattices from a Continuum Medium by Sequential Activation of Self-Assembly"; 83 Physical Review 041610-1-041610-8 (2011).

* cited by examiner

601

602

HIGH PERFORMANCE LITHIUM BATTERY ELECTRODES BY SELF-ASSEMBLY PROCESSING

CROSS-REFERENCES TO RELATED APPLICATIONS

This application claims priority to U.S. Patent Application No. 61/935,526, filed Feb. 4, 2014, which is incorporated herein by reference for all purposes.

STATEMENT REGARDING FEDERALLY SPONSORED RESEARCH

This invention was made with government support under CMMI-0700048 awarded by the National Science Foundation. The government has certain rights in the invention.

BACKGROUND OF THE INVENTION

1. Field of the Invention

This invention relates to electrochemical devices, such as lithium ion electrodes, and methods for making such devices. Specifically, this invention relates to high performance lithium ion electrodes having well-controlled and organized nanostructures, and methods of using electric fields to induce the assembly of particles to form such electrodes.

2. Description of the Related Art

Lithium-ion batteries have extremely favorable electrical storage and discharge characteristics and occupy a large and growing market. The total world market for lithium-ion batteries was $9.61 billion in 2009 and estimated to be $31.55 billion by 2016 (http://www.frost.com/c/10077/sub-lib/research-pdf.do?catId=N76F-27-00-00-00). In the automotive sub-market, 2010 saw revenues of $502 million and an expectation of $10.49 billion by 2016 (http://www.frost.com/c/10077/sublib/research-pdf.do?catId=N9E7-01-00-00-00). For many years, lithium-ion batteries have been used extensively in consumer electronics such as laptop and camera batteries. There is also increasing popularity for use in transportation, specifically electric vehicles (e.g., Tesla Motors) and aviation (e.g., Boeing 787), due to size, weight, and charge improvements over other technologies such as nickel-based batteries.

However, lithium batteries can be the subject of safety concerns due to their flammability if mishandled or poorly designed, and the impact of safety events could lead to scares about their usage, as in the Boeing 787 incidents in early 2013. Nevertheless, the significant advantages offered by lithium batteries appear to overcome concerns as publicity from adverse events subside.

Improving availability of the electrode's active material to the battery's electrolyte is a popular method of improving battery performance. Traditional processes included manual grinding of active material and binding in a solution to encourage homogeneity through random mixing, leading to even availability of active material on the electrode surface. Current techniques include combining nanoparticles of active material with conductive coating, nanowires, and mesoporous structures with embedded active material that allows for electrolyte penetration, and thus active material availability beyond the surface of the electrode.

Needed in the art is a technology for enhancing the rate capability, energy density, and cycling life of the battery and reducing cost. Specifically, needed in the art is a technology targeting the efficient mass manufacturing of lithium-ion battery electrodes with improved electrical characteristics and lower manufacturing costs.

SUMMARY OF THE INVENTION

The present invention provides methods and processes for producing electrochemical devices having well-organized nanostructures or microstructures. In one aspect, the present invention discloses a simple, cheap, and fast nanotechnology-based manufacturing process for fabricating high performance electrodes. The present processing technique is highly versatile and can be applied to diverse materials systems for anode and cathode electrodes.

The present invention also discloses self-assembly methods and techniques by using electric fields to induce the formation of ordered particle network structures for enhanced battery performance. Specifically, the present self-assembly methods and techniques are suitable for lithium ion batteries.

In one aspect, the invention provides a method for producing an electrochemical device. The method includes the steps of: (a) placing a slurry comprising an active material and a second material on a metallic surface to form a slurry layer; (b) applying an electric field to the slurry layer on the metallic surface wherein a dipole moment of the active material and a dipole moment of the second material are induced such that the active material and the second material are oriented to form a structure along with a direction of the electric field; and (c) removing the electric field such that the structure remains stable to form the electrochemical device.

The active material may comprise active material particles, and the second material may comprise conductive particles. In one version of the method, a plurality of structures are formed along the direction of the electric field, and at least some of the plurality of structures include active material particles and conductive particles. In another version of the method, a plurality of structures are formed along the direction of the electric field, and at least some of the plurality of structures include a core of the active material particles and a shell of the conductive particles. In another version of the method, a plurality of structures are formed along the direction of the electric field, and at least some of the plurality of structures include a shell of the active material particles and a core of the conductive particles. In another version of the method, a plurality of structures are formed along the direction of the electric field, and at least some of the plurality of structures include alternating active material particles and conductive particles. In another version of the method, a plurality of linear structures are formed along the direction of the electric field.

The active material may comprise first active material particles, and the second material may comprise second active material particles different from the first active material particles. In one version of the method, a plurality of structures are formed along the direction of the electric field, and at least some of the plurality of structures include first active material particles and second active material particles. In another version of the method, a plurality of structures are formed along the direction of the electric field, and at least some of the plurality of structures include alternating first active material particles and second active material particles. In another version of the method, a plurality of linear structures are formed along the direction of the electric field.

The active material may comprise first active material particles having a first average size, and the second material may comprise second active material particles having a second average size different from the first average size. The active material may comprise first active material particles having a first average size, and the second material may comprise conductive particles having a second average size different from the first average size. The active material may comprise first active material particles having a first composition, and the second material may comprise second active material particles having a second composition different from the first composition.

In one form, the electrochemical device is a cathode of a lithium ion battery in which the active material is selected from the group consisting of $LiCoO_2$, $LiFePO_4$, $LiMnO_2$, $LiMnO_4$, $LiCoFePO_4$, $LiNiO_2$, and mixtures thereof. The active material may be selected from the group consisting of carbon-based materials, Si-based materials, and metal oxides. The active material may comprise nanoparticles or microparticles. The second material may comprise conductive nanoparticles or conductive microparticles. The electric field may be in a range of 0.01 to 35 kV/cm. The electric field may be an AC field. The electric field may be a DC field.

The second material may be a conductive additive selected from the group consisting of graphite, carbon black, acetylene black, Ketjen black, channel black, furnace black, lamp black, thermal black, conductive fibers, metallic powders, conductive whiskers, conductive metal oxides, and mixtures thereof.

The slurry may further comprise a binder. The binder may be selected from the group consisting of polytetrafluoroethylene, polyvinylidene fluoride, cellulose, polyvinyl alcohol, carboxymethylcellulose, starch, hydroxypropylcellulose, regenerated cellulose, polyvinyl pyrollidone, tetrafluoroethylene, polyethylene, polypropylene, ethylene-propylene-diene terpolymers, sulfonated ethylene-propylene-diene terpolymers, styrene butadiene rubbers, fluoro-rubbers, copolymers, polymer-saponified polyvinyl alcohol, and mixtures thereof.

In another aspect, the invention provides an electrochemical device electrode comprising an ordered structure including active material particles, conductive particles, and a binder. The structure may include a plurality of columns comprising a core of the active material particles and a shell of the conductive particles, and at least some of the columns may be connective. The structure may include a plurality of columns comprising a shell of the active material particles and a core of the conductive particles, and at least some of the columns may be connective. The structure may comprise a network of alternating active material particles and conductive particles. The structure may comprise a plurality of aligned linear structures, and the linear structures may have a deviation angle of less than 50 degrees.

The electrode may be suitable for the cathode or anode of a lithium ion battery. When the electrode is a cathode, the active material particles may be selected from the group consisting of $LiCoO_2$, $LiFePO_4$, $LiMnO_2$, $LiMnO_4$, $LiCoFePO_4$ and $LiNiO_2$, and mixtures thereof. The active material particles and/or the conductive particles may be nanoparticles. The active material particles and/or the conductive particles may be microparticles. The conductive particles may be selected from the group consisting of graphite, carbon black, acetylene black, Ketjen black, channel black, furnace black, lamp black, thermal black, conductive fibers, metallic powders, conductive whiskers, conductive metal oxides, and mixtures thereof. The binder may be selected from the group consisting of polytetrafluoroethylene, polyvinylidene fluoride, cellulose, polyvinyl alcohol, carboxymethylcellulose, starch, hydroxypropylcellulose, regenerated cellulose, polyvinyl pyrollidone, tetrafluoroethylene, polyethylene, polypropylene, ethylene-propylene-diene terpolymers, sulfonated ethylene-propylene-diene terpolymers, styrene butadiene rubbers, fluoro-rubbers, copolymers, polymer-saponified polyvinyl alcohol, and mixtures thereof.

The structure may be anisotropic with respect to direction of conductivity. The structure may be a nanostructure. The structure may be a microstructure.

These and other features, aspects, and advantages of the present invention will become better understood upon consideration of the following detailed description, drawings and appended claims.

DETAILED DESCRIPTION OF THE INVENTION

Figure 1:
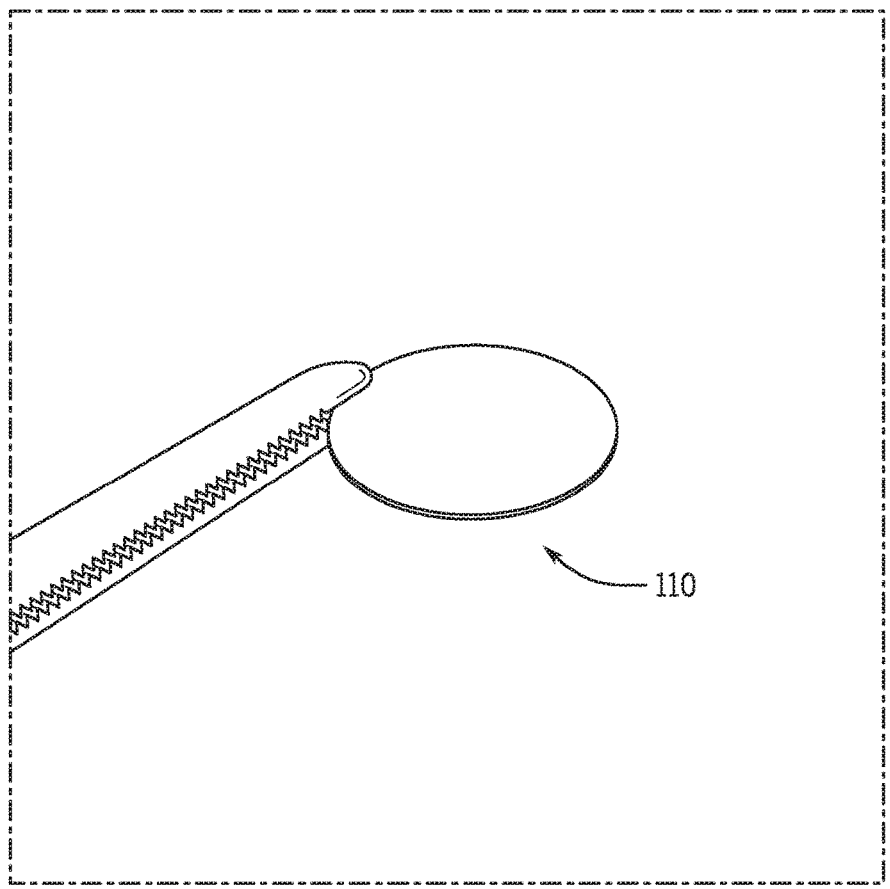
FIG. 1 is an image showing a sample product for a coin-cell type battery produced by the methods of the present invention. The size of the cell is 10 millimeters in diameter, and it weighs around 20~30 milligrams.

The term "self-assembly", as used herein, refers to a type of process in which a disordered system of pre-existing components forms an organized structure or pattern as a consequence of specific, local interactions among the components themselves. In one version of the present invention, self-assembly refers to the self-assembly of nanoparticles or microparticles.

The term "stable metal", as used herein, refers to a metal or an alloy that is resistant to corrosion and oxidation in an aqueous solution or in moist air. An example of stable metal may include noble metals or related alloys, e.g., ruthenium, rhodium, palladium, silver, osmium, iridium, platinum, and gold. A stable metal in the present invention may also include aluminum (Al), copper (Cu), iron (Fe), Zinc (Zn), and related alloys.

In one version of the present invention, the term "particle" refers to nanoparticles or microparticles. Nanoparticles are those having a diameter in the range of 0.1 nanometer to 1000 nanometers. Microparticles are those having a diameter in the range of 1 micrometer to 1000 micrometers.

The term "anionic polymer", as used herein, refers to a polymer having overall negative charges. In the present invention, anionic polymers are attached to a metal surface having positive charges by an electrostatic force.

The term "cationic polymer", as used herein, refers to a polymer having overall positive charges. In the present invention, cationic polymers are attached to an anionic polymer layer on a metal surface by an electrostatic force.

In one embodiment, the present invention relates to an electrochemical device. A suitable electrochemical device may include, a conductor, a battery, a capacitor, a sensor, a photoelectrochemical solar cell or any other electrochemical energy storage device. A suitable electrochemical device may further include a light-emitting electrochemical cell (LEC or LEEC), a light-emitting device (LED), a fuel cell or any other electrochemical device. A capacitor may include an ultracapacitor, also referred to as a supercapacitor, an electrical double-layer capacitor, or an electrochemical capacitor. In one preferred embodiment, the present invention relates to a battery and/or a capacitor. More preferably, a battery of the present invention may include a lithium ion battery (LIB), a sodium ion battery (SIB), or a potassium ion battery (PIB).

An applicable lithium ion battery may include any lithium ion battery using metal oxides or phosphates as an active cathode material. A suitable metal oxide for cathode materials may include lithium cobalt oxide (LCO), lithium iron phosphate (LFP), lithium manganese oxide (LMO), lithium nickel manganese cobalt oxide (NMC), lithium nickel cobalt aluminum oxide (NCA), lithium titanate (LTO), lithium vanadium oxide (LVO), lithium iron fluorophosphates, and others. In another embodiment, a suitable metal oxide for cathode materials in the present invention may include any layered compounds having hexagonal symmetry based on $\alpha$-NaFeO$_2$ structure with a space group of R3$^-$m, such as LiNiO$_2$, LiNi$_x$Co$_y$O$_2$, LiMn$_x$Co$_y$O$_2$, LiMn$_x$Ni$_y$O$_2$, LiNi$_x$Co$_y$Al$_z$O$_2$, LiNi$_{1/3}$Mn$_{1/3}$Co$_{1/3}$O$_2$ and others. Further, many different elements, e.g., Co, Mn, Ni, Cr, Al, or Li, may be substituted or additionally added into the $\alpha$-NaFeO2 structure to influence electronic conductivity, ordering of the layer, stability on delithiation and cycling performance of the cathode materials. LiNi$_{1/3}$Mn$_{1/3}$Co$_{1/3}$O$_2$ (often called NMCs) are currently being commercialized for use in consumer electronic batteries, but the high cobalt content makes them too expensive for vehicular applications such as electric vehicles (EV), plug-in hybrid electric vehicles (PHEVs), or hybrid electric vehicles (HEVs). Partial or full substitution of Co with Al, Ti, and Fe is being explored. Fe substitution generally decreases capacity and results in poorer rate and cycling behavior. Interestingly, low levels of substitution with Al or Ti improve aspects of performance with minimal impact on energy densities, for some formulations. High levels of Al substitution compromise specific capacity, however, so further improvements require that the Ni and Mn content be increased and Co correspondingly decreased. Low levels of Al or Ti substitution can then be used offset negative effects induced by the higher Ni content. A suitable cathode material may also include doping another material into the metal oxides. For example, one can dope aluminum, niobium and zirconium into a metal oxide to boost the material's conductivity. One can also dope one metal material to increase another metal oxide material's performance, e.g., 5% vanadium-doped lithium iron phosphate olivine.

An applicable lithium ion battery may include any lithium ion battery using as an active anode material graphite, lithium, lithium titanate, hard carbon, a tin/cobalt alloy, or silicon/carbon. An applicable lithium ion battery may include separators comprising polypropylene, polyethylene, or layered polypropylene/polyethylene membranes.

In one embodiment, the present invention discloses methods and processes of using electric fields to induce the self-assembly of particles, leading to the formation of electrochemical devices. Specifically, the electrochemical device may be a battery, more specifically, a lithium ion battery. The present invention applies a self-assembly technique by using electric fields to induce the formation of ordered particle structures for enhanced battery performance. The functioning of lithium ion batteries is mainly determined by the electrode structure, which conventionally is composed of randomly distribution particles. Previously available electrodes may be created using a slurry of randomly distributed particles of active material, conductive additive, and binder in a carrier solvent; however, the lack of a highly ordered particle structure can be a major limiting factor on battery performance.

In one embodiment, the present method for producing an electrochemical device comprises the steps of: (a) obtaining an active material; (b) mixing the active material with a conductive additive and a binder to form a slurry; (c) placing the slurry comprising the active material, the conductive additive and the binder on a metal surface; (d) applying an electric field to the slurry on the metal surface wherein the dipole moment of the active material and the conductive additive is induced such that the active material and the conductive additive are oriented to form organized structures along with the direction of the electric field, and (e) removing the electric field such that the organized structures along with the direction of the electric field remain stable to form the electrochemical device.

Any active battery materials may be used for the present invention. For example, the present invention may be applicable to either anode or cathode materials. In one embodiment, the present methods and processes may be used to produce electrochemical devices having multiple active materials with different chemical compositions. For example, an anode or cathode electrode having binary structures of multiple active materials may be produced by using the present electric induced self-assembly method.

In one preferred embodiment, the active materials and/or conductive materials may be particles. The suitable particles may have an average diameter of 0.1 nanometers to 500 micrometers. The suitable particles may include nanoparticles or microparticles. The particles may have any suitable shapes, including sphericals, anisotropic shapes such as wires, tubes, rods, plates and others. Preferably, the active material particles have anisotropic shapes such as nanowires or microwires. The active material particles may have an a low aspect ratio. The aspect ratio is defined as the ratio between the largest linear dimension of a particle such as an active material particle and the largest dimension perpendicular to said largest dimension. "Low aspect ratio" as used herein refers to an aspect ratio that is equal to or less than 100:1.

In another embodiment, the suitable particles may have more than one shape. The more than one shape of the active material particles may be assembled into organized structures, such as binary superlattice structures, after the induction of the electric field.

The active material particles may be obtained from any suitable sources. For example, suitable particles for active materials may be obtained from commercial sources. Suitable particles for active materials may also be chemically produced by using wet-chemical techniques, such as sol-gel synthesis. Suitable particles for active materials may also be physically produced, such as by attrition. In attrition, macroscale or microscale particles are ground in a ball mill, a planetary ball mill, or other size-reducing mechanism. The resulting particles may be air classified to recover nanoparticles.

In one embodiment of the present invention, one shape type of active material particles may be used to produce electrochemical devices having well-organized structures following electric induced self-assembly. In another embodiment of the present invention, at least two shape types of active material particles may be used to produce electrochemical devices having well-organized structures following electric-field-induced self-assembly. For example, two different shapes of cathode materials may be used to produce super-lattice structures under the electric field. The interaction among different dipoles may lead to controllable formation of diverse structures, including particle columns with gradient material properties from inside to outside and various hierarchically layered or three-dimensional particle chain networks.

In one preferred embodiment, the active material particles may be mixed with other particles, such as conductive particles. For example, the present methods and processes may produce self-assembled functional gradient superlattice structures by subjecting binary nanoparticles to an electric field. The interaction among different dipoles may lead to the controllable formation of diverse structures, including particle columns with gradient material properties from inside to outside and various hierarchical layered or three-dimensional particle chain networks.

After the active material particles and/or other particles are obtained, the active material particles and/or other particles are mixed with a conductive additive and a binder into a slurry.

Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Non-limiting examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (available from Timcal Co.).

Suitable conductive materials may also include conductive polymer materials. Conductive polymer materials may include either anionic or cationic polymer materials.

Any suitable materials may be used as a binder in the present invention. Examples of the binder include polytetrafluoroethylene (PTFE), polyvinylidene fluoride (PVdF), cellulose, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymers (EPDM), sulfonated EPDM, styrene butadiene rubbers, fluoro-rubbers, various copolymers, and polymer-saponified polyvinyl alcohol.

Any suitable method may be used to mix the active material particles and/or other particles with conductive materials and binders into a uniform slurry. Suitable mixing methods may include sonication, mechanical stirring, physical shaking, vortexing and any other suitable means.

Any suitable solvents may be used for mixing the active material particles and/or other particles with conductive materials and binders into a uniform slurry. Either aqueous or non-aqueous solvents may be used for the present invention. Preferably, non-aqueous organic solvents are used. A suitable solvent may include alkyl carbonates or alkylene carbonates, alkyl acetates, N,N-disubstituted acetamides, sulphoxides, nitriles, glycol ethers, ethers, dioxolane, bis (trifluoromethanesulphonyl)imide, 1,2-bis(trifluoroacetoxy) ethane, N,N-dimethyltrifluoroacetamide, carbazoles, phenothiazines, phenoxazines, acridines, dibenzoazepines, phenazines, or a mixture of any of these solvents. Fluoromethyl methylcarbonate may also be useful as a solvent or solvent additive for such batteries. Generally, it is advisable to have a very large reservoir of useable compound classes available as a solvent or solvent additive for conductive salts in electrolytes.

Other suitable solvents and additives may include 1-acetoxy-2-fluorobenzene, 1-acetoxy-3-fluorobenzene, 1-acetoxy-4-fluorobenzene, 2-acetoxy-5-fluorobenzyl acetate, 4-acetyl-2,2-difluoro-1,3-benzodioxole, 6-acetyl-2,2,3,3-tetrafluorobenzo-1,4-dioxin, 1-acetyl-3-trifluoromethyl-5-phenylpyrazole, 1-acetyl-5-trifluoromethyl-3-phenylpyrazole, allylpentafluorobenzene, benzotrifluoride, benzoyltrifluoroacetone, 1-benzoyl-3-trifluoromethyl-5-methylpyrazole, 1-benzoyl-5-trifluoromethyl-3-methylpyrazole, 1-benzoyloxy-4-(2,2,2-trifluoroethoxyl)benzene, 1-benzoyl-4-trifluoromethylbenzene, 1,4-bis(t-butoxy)tetrafluorobenzene, 2,2-bis(4-methylphenyl)hexafluoropropane, bis(pentafluorophenyl) carbonate, 1,4-bis(1,1,2,2-tetrafluoroethoxy)benzene, 2,4-bis(trifluoromethyl)benzaldehyde, 2,6-bis(trifluoromethyl)benzonitrile, difluoroacetophenone, 2,2-difluorobenzodioxole, 2,2-difluoro-1,3-benzodioxole-4-carbaldehyde, 4,4'-difluorobiphenyl, 1-[4-(difluoromethoxy)phenyl]ethanone, 3-(3,5-difluorophenyl)-1-propene, trans-$\alpha,\beta$-difluorostilbene, fluorobenzophenone, difluorobenzophenone, 1-(2'-fluoro[1,1'-biphenyl]-4-yl)propan-1-one, 6-fluoro-3,4-dihydro-2H-1-benzothiin-4-one, 4-fluorodiphenyl ether, 5-fluoro-1-indanone, 1-(3-fluoro-4-methoxyphenyl)ethanone, 4-fluoro-α-methylstyrene, fluorophenylacetonitrile, the group of compounds having an Si—C bond consisting of bis(pentafluorophenyl)dimethylsilane, 1,2-bis[difluoro(methyl)silyl]ethane, N,O-bis(trimethylsilyl)trifluoroacetamide, N-(t-butyldimethylsilyl)-N-methyltrifluoroacetamide, t-butyldimethylsilyl trifluoromethanesulphonate, 2-dimethylamino-1,3-dimethylimidazolium trimethyldifluorosiliconate, diphenyldifluorosilane, the group of compounds having a C=O bond consisting of bis(1,1,1,3,3,3-hexafluoroprop-2-yl) 2-methylenesuccinate, bis(1,1,1,3,3,3-hexafluoroprop-2-yl) maleate, bis(2,2,2-trifluoroethyl) maleate, bis(perfluorooctyl) fumarate, bis(perfluoroisopropyl) ketone, 2,6-bis(2,2,2-trifluoroacetyl)cyclohexanone, butyl 2,2-difluoroacetate, cyclopropyl 4-fluorophenyl ketone, diethyl perfluoroadipate and N,N-diethyl-2,3,3,3-tetrafluoropropionamide.

Suitable solvents and additives may also include the group of compounds having a C=C bond consisting of allyl 1H,1H-heptafluorobutyl ether, trans-1,2-bis(perfluorohexyl)ethylene, (E)-5,6-difluoroocta-3,7-dien-2-one, or the group of amines consisting of N,N-diethyl-1,1,2,3,3,3-hexafluoropropylamine as an additive for electrolytes and electrolyte solvents in lithium ion batteries.

After the uniform slurry is obtained, the slurry of active materials, conductive materials and binders is placed on a metal substrate surface to form a slurry layer. The metal substrate may include any stable and conductive metals. A suitable metallic substrate may include aluminum (Al), copper (Cu), silver (Ag), iron (Fe), gold (Au), nickel (Ni), cobalt (Co), and stainless steel. In one preferred embodiment, the metal substrate is aluminum.

The slurry layer on the metal surface may be either uniform or non-uniform. Preferably, a uniform slurry layer may be used. The thickness of the slurry layer may be in the range of a few micrometers to a few centimeters. In one embodiment, the thickness of the slurry layer is on the range of 50 micrometers to 3 centimeters, more preferably 60 micrometers to 5 millimeters.

After the slurry of active materials, conductive materials and binders is placed on a metal substrate surface, an electric field is applied on the slurry layer. Although an electric field having any field direction may be used, preferably an electric field with a field direction perpendicular to the metal substrate surface may be applied to the slurry layer.

Either an alternating current (AC) or a direct current (DC) electric field may used. Any suitable intensity of electric field may be used in the present invention. For example, a suitable electric field may have an intensity in the range of 0.001 to 100 KV/cm, preferably in the range of 0.01 to 50 KV/cm, more preferably in the range of 0.1 to 10 KV/cm, most preferably 0.5 to 6 KV/cm.

An electric field having any suitable frequency may be used for the present invention. For example, a suitable frequency of electric field may be in the range of 1 Hz-1000 MHz, preferably 2 Hz-100 MHz, more preferably 5 Hz-1 MHz, most preferably 7 Hz-0.1 MHz.

Under the electric field, a dipole moment of each of the particles would be induced. Therefore, particles, e.g., monodispersed sphericals, may acquire electric moments and line up into chains parallel to an applied electric field.

In one preferred embodiment of the present invention, there may be at least two different kinds of particles. The two or more different kinds of particles may be selected from the group consisting of active materials (either cathode or anode materials), conductive materials, and binders. The electric field in the present invention may be applied to assemble the different particles into two-dimensional or three-dimensional crystal structures.

In one preferred embodiment, a suitable electric field may be applied to assemble the two or more different particles into a well-organized structure with improved properties. In one specific embodiment, the well-organized structures may have improved properties in conductivity.

In one embodiment, a suitable electric field may cause the different types of particles to form linear structures aligned with the direction of the electric field. As used herein, the phrase of "align with the direction of the electric field" refers to the linear structures of the particles are in closely co-linear or substantially parallel to the direction of the electric field. For example, the linear structures of the particles may have a deviation angle less than 50 degrees, preferably less than 30 degrees, from the direction of the electric field.

In one embodiment, the different types of particles may form aggregated chain structures or thick column structures aligned with the direction of the electric field after the induction of suitable electric fields.

In one embodiment, the aggregated chain structures or thick column structures may be produced through a seed-mediated process. For example, after the application of an electric field to the slurry layer on the metal surface wherein the dipole moment of the active material and the conductive additive is induced, the different types of particles may be initially oriented to form seed structures. Subsequently, a large area self-assembly process may be initiated. Aggregated chain structures or thick column structures may form over the seed structures (see, for example, Zhouzhou Zhao and Wei Lu, "Growing large nanostructured superlattices from a continuum medium by sequential activation of self-assembly', *Physical Review* E 83, 041610, 22 Apr. 2011).

In another embodiment, the aggregated chain structures or thick column structures may be produced directly in the absence of a seed-mediated process. Applicant envisions that the direct formation process may be similar to the process of magnetic colloids, where local crystallites with triangular and square symmetries have been observed by ultrafast quenching of binary colloidal suspensions in an external magnetic field.

In one embodiment, the alignment of the different types of particles with the direction of the electric field into aggregated chain or thick column structures may create direction-specific conductive pathways along with the structures. For example, in the direction-specific conductive pathways, the conductivity may be high in the direction of the lines of conductive particles and low or non-existing in the direction perpendicular to lines of conductive particles. Consequently, the formed battery electrode material may be anisotropic with respect to the direction of conductivity.

The direction-specific conductive pathways may also be able to enhance the macroscopic conductivity of the resulting battery material. For example, the formation of conductive pathways may allow a significantly lower amount of conductive particles in the battery electrode material to remain conductive than is otherwise necessary for creating an electrical contact for the material when it contains randomly distributed conductive particles. The amount of conductive particles may thereby be reduced and may be at least many times lower than the percolation threshold.

In one embodiment of the present invention, the different particles may assemble into isolated columns with a core-shell configuration. The core may comprise the more polarizable particles, while the shell may comprise the other (less polarizable) particles. In one embodiment, the present methods and processes may form particle columns with gradient material properties from inside to outside and various hierarchically layered or three-dimensional particle chain networks. In one embodiment, the self-organized functionally gradient structure in the core-shell configuration may offer a gradual transition of the permittivity from the core to that of the medium (see, for example, Jonghyun Park and Wei Lu, "Self-assembly of nanoparticles into heterogeneous structures with gradient material properties", *Physical Review* E 83, 031402, 22 Apr. 2011).

In one embodiment of the present invention, the morphology of the induced structures, such as core-shell columns, may be controlled by varying the experimental parameters. The suitable experimental parameters may comprise permittivity, volume fraction, particle size, and the frequency of the electric field. The suitable experimental parameters may further comprise temperature, intensity of the electric field, polarization ability of the particles and solvents, dielectric permittivity and dielectric constant of the particle, concentrations of the particles, and others.

In one embodiment, isolated column structures with a core-shell configuration may form when the particles are more polarizable than the solvents and the concentrations of particles are relatively low. In another embodiment, when the particles are more polarizable than the solvents and the concentrations of particles are high, continuously connective column structures may form and the continuously connective column structures may have isolated holes between the columns.

In yet another embodiment, when one type of particles is more polarizable than the solvents while the other types of particles are less polarizable than the solvents, the particles may form chains with one type of particles along the field direction and the particle chains may be highly dispersed and form a network of alternating different particles.

In one embodiment, an annealing process may be additionally used to form the ordered structures. The suitable annealing process may comprise adjusting temperature or changing the intensity of the electric field. After the annealing process, stable and well-organized column structures may be produced. The stable and well-organized column structures may be used as battery electrodes.

In one embodiment, an electrolyte may be added during the present methods or processes. An electrolyte may also be added after the formation of electrochemical devices so that a lithium ion battery may be produced.

Examples of the non-aqueous electrolyte include non-protic organic solvents such as N-methyl-2-pyrollidinone, propylene carbonate (PC), ethylene carbonate (EC), butylene carbonate, dimethyl carbonate (DMC), diethyl carbonate (DEC), ethylmethyl carbonate (EMC), gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the non-aqueous electrolyte include organic solid electrolytes such as polyethylene derivatives, polyethylene oxide derivatives, polypropylene oxide derivatives, phosphoric acid ester polymers, poly agitation lysine, polyester sulfide, polyvinyl alcohol, polyvinylidene fluoride, and polymers containing ionic dissociation groups.

Examples of the non-aqueous electrolyte include inorganic solid electrolytes such as nitrides, halides and sulfates of lithium such as $Li_3N$, $LiI$, $Li_5NI_2$, $Li_3N$—$LiI$—$LiOH$, $LiSiO_4$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas and may further contain fluoroethylene carbonate (FEC), propene sultone (PRS) and the like.

In a preferred embodiment, the lithium salt-containing non-aqueous electrolyte can be prepared by adding a lithium salt, such as $LiPF_6$, $LiClO_4$, $LiBF_4$, $LiN(SO_2CF_3)_2$, to a mixed solvent of a cyclic carbonate such as EC or PC as a highly dielectric solvent and linear carbonate such as DEC, DMC or EMC as a low-viscosity solvent.

In one embodiment of the present invention, no additional step of solvent elimination process may be needed. During the process of electric-field-induced assembly and annealing, the solvents may be eliminated. Therefore, additional step of solvent elimination process may not be necessary.

After organized structures of the particles along with the direction of the electric field are produced, the electric field is removed. In one preferred embodiment, organized structures of the particles remain stable in their position after the removal of the electric field. The electrochemical device, such as an electrode of a lithium ion battery, has thus formed.

In one embodiment, the present methods and processes may be applicable for producing either an anode electrode system or a cathode electrode system. The present electric field induced self-assembly technique is not limited by the type of the particle materials. Either anode or cathode particle materials may be induced to form ordered particle network structures.

In another embodiment, the present methods and processes may be applicable for producing either an anode cathode or a cathode electrode having multiple material systems. For example, self-assembled functional gradient super-lattice structures may be obtained by subjecting binary nanoparticles in an electric field. The interaction among different dipoles leads to controllable formation of diverse structures, including particle columns with gradient material properties from inside to outside and various hierarchically layered or three-dimensional particle chain networks.

In one embodiment, various factors such as permittivity, volume fraction, particle size, and the frequency of the electric field may be utilized to control the morphology of the induced structures to enable designed nanofabrication.

In another aspect, the present invention discloses a method of fabrication of high performance electrodes with a simple, cheap, and fast nanotechnology-based manufacturing process. The present method of fabrication is easy to operate without the need for expensive equipment. The present method of fabrication may be easily scaled-up for mass production. In the present invention, the controlled assembled electrochemical devices may be obtained by controlling various parameters. For example, electric field strength, distribution, and frequency may be the main control parameters. The developed processing technique has, without limitation, the following characteristics: (a) it is highly versatile and can be applied to diverse materials systems; (b) it is easy to operate and control, without the need of expensive equipment; and (c) it can be easily scaled-up for mass production.

In one aspect, the present invention discloses a low-cost, high-throughput self-assembly process to create diverse well-organized nanoparticle network structures for battery electrodes.

In one embodiment, the present process for creating diverse well-organized particle network structures comprises the steps of: (a) obtaining at least one type of active material particles; (b) mixing the at least one type of active material particles with conductive additives and binders to form a slurry; (c) placing the slurry comprising the at least one type of active material particles, the conductive additive and the binder on a metal surface; (d) applying an electric field to the slurry on the metal surface wherein the dipole moment of the active material particles and the conductive additive is induced such that the active material particles and the conductive additive are oriented to form organized structures along with the direction of the electric field, and (e) removing the electric field such that the organized structures along with the direction of the electric field remain stable to form the electrochemical device.

In another embodiment, the one or more type of active material particles may be mixed with other types of particles. For example, the other types of particles may be other active material particles, conductive additive particles or any other suitable particles for a battery.

In one preferred embodiment, at least two different types of particles are obtained. The at least two different types of particles may be induced to form dipole moments after the application of an electric field. Any suitable electric field as discussed above may be used. Under the electric field, the at least two different types of particles may be oriented to form organized structures along with the direction of the electric field.

In one preferred embodiment, the resulting organized structures along with the direction of the electric field may remain stable at their positions after the removal of the electric field. The diverse well-organized particle network structures are thus produced. The particle network having organized distribution of nanoparticles will provide superior properties including fast transport, enhanced surface reactivity, and improved structural integrity that can dramatically improve the battery performance.

The present process may create optimized nanoparticle network structures in battery electrodes, which have demonstrated significantly enhanced rate capability, high energy density, long cycling life, and reduced cost.

In one aspect, the present invention discloses a nanofabrication process to manufacture high performance lithium-ion battery electrodes that can enhance the capacity and power available from the battery. Specifically, the present process promotes organized self-assembly of electrode structures from a nanoparticle slurry of active material particles, conductive additive, and binder. This organized structure enhances active material availability to the electrolyte, allowing for faster transport, enhanced surface reactivity, and improved structural integrity and improves battery performance over the standard process of randomized mixing.

In one embodiment, the present nanofabrication process may apply an electric field to a mobile platform carrying a slurry of constituent electrode nanoparticles, the nanoparticles polarize and self-organize into predictable structures. In one embodiment of the present nanofabrication process, the field and platform may be controllably tuned so that electrode structures with enhanced performance may be cheaply produced in high volumes.

In one embodiment, the manufacturing process of nanofabrication may be easily deployed independently or as part of a complete battery assembly line and produces electrodes that demonstrate enhanced rate capability, high energy density, long cycling life, and reduced cost.

Applicant envisions that the present invention may be applicable to produce high rate, high density automotive batteries, longer lasting consumer and medical device batteries, lower cost industrial batteries, and enhanced lithium-ion battery manufacturing.

The present invention may have many advantages over traditional processes. Some of the advantages may include: (1) the resulting electrodes have enhanced rate capability, higher energy density, and longer cycling life; (2) the use of self-assembly makes the process easy to operate and control, lowering manufacturing cost; (3) the easily scalable processes for mass production; and (4) processes that are adaptable to a variety of material systems.

EXAMPLES

The following Examples have been presented in order to further illustrate the invention and are not intended to limit the invention in any way.

Example 1

Lithium-Ion Battery

With the electric field self-assembly technique, Applicant has manufactured electrode structures for Li-ion battery applications. FIG. 1 shows a sample product for a coin-cell type battery 110. The size of the cell is 10 mm in diameter, and it weighs around 20~30 mg. The cathode electrode was made from lithium manganese oxide powder, polyvinylidene fluoride binder, and carbon black in a weight ratio of 90:5:5. The slurry was coated on an aluminum foil, then the coated foil was placed under a DC electric field (2 kV/cm) for processing. Then, it was dried in a vacuum dryer (120 degrees Celsius) over 12 hours. Next, a coin cell was assembled in an argon-filled glove box. The dried electrode was used as a working electrode and a lithium foil was used as a counter electrode. The electrolyte solution was 1M $LiPF_6$ dissolved in a mixture of ethylene carbonate and dimethyl carbonate with a volume ratio of 1:1.

Example 2

The Performance of the Lithium-Ion Battery

The as-prepared lithium-ion battery of Example 1 shows improved performance.

Figure 2:
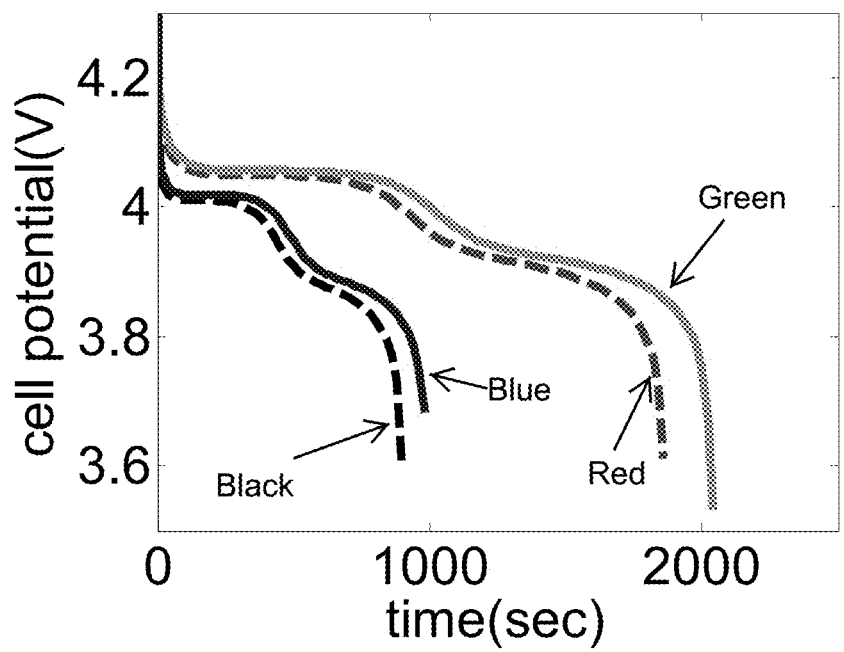
FIG. 2 is a graph showing the computationally simulated results of the performance improvement of the present technology over conventional electrodes composed of random particles by using a 3D finite element battery model. The solid lines represent electrodes made with the present technology, while the dotted lines represent conventional electrodes. The green and red colors represent 1C rate. The black and blue colors represent 2C rate. In both C rates, the electrodes processed with the present technology show improved capacity.

FIG. 2 is a graph showing the computationally simulated results of the performance improvement of the present technology over conventional electrodes composed of random particles by using a 3D finite element battery model. The solid lines represent electrodes made with the present technology, while the dotted lines represent conventional electrodes. The green and red colors represent 1C rate. The black and blue colors represent 2C rate. In both C rates, the electrodes processed with the present technology shows improved capacity.

Figure 3:
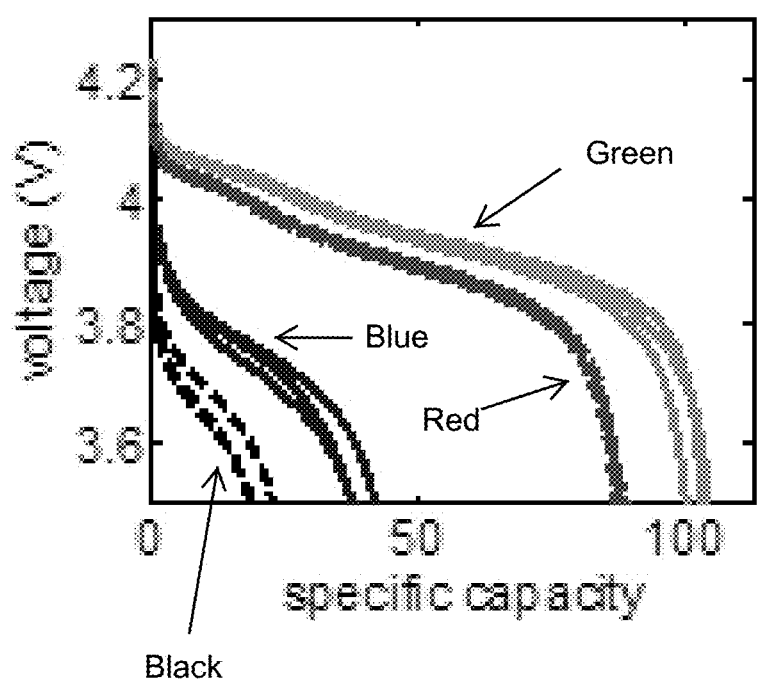
FIG. 3 is a graph showing the experimental results of one battery system produced by using the present technology and those of the other battery system produced by using conventional technology. The green and red lines represent the case of a low C rate (C/3), and the blue and black lines represent the case of a high C rate (1C). The solid lines represent the electrode made by using the present technology, while the dotted lines represent the electrode made by using the conventional method.

FIG. 3 is a graph showing the experimental results of one battery system produced by using the present technology and the other battery system produced by using conventional technology. The green and red lines represent the case of a low C rate (C/3), and the blue and black lines represent the case of a high C rate (1C). The solid lines represent the electrode made by using the present technology, while the dotted lines represent the electrode made by using the conventional method.

Figure 4:
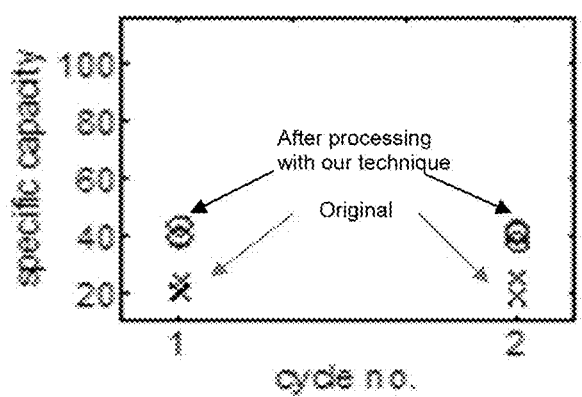
FIG. 4 is a graph showing the specific capacity data from repeated measurements. The present technique demonstrated about 100% improvement in total capacity at 1C.

FIG. 4 is a graph showing the specific capacity data from repeated measurement. The present technique demonstrated about 100% improvement in total capacity at 1C.

Example 3

Self-Assembly of Binary Nanoparticle Systems

Figure 5:
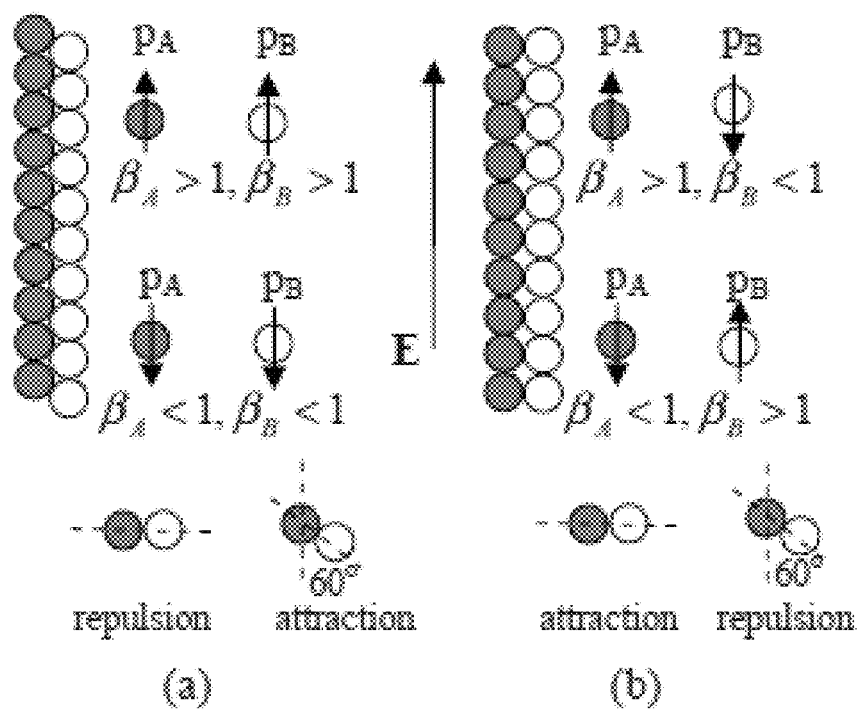
FIG. 5 shows the configuration relation between two chains formed using particles A and B. In 5(a), particles A and B have the same polarization direction. They repel each other in a plane perpendicular to the electric field. The interaction becomes attractive if the two particles shift relative to each other by d/2. This configuration has lower energy. In 5(b), particles A and B have opposite polarization directions. The parallel configuration has lower energy.

Looking at FIG. 5, one defines the permittivity ratios of A and B particles to that of the medium by $\beta_A = \epsilon_A/\epsilon_m$ and $\beta_B = \epsilon_B/\epsilon_m$. The direction of an induced dipole is along ($\beta>1$) or opposite ($\beta<1$) to the applied field E. The interactive energy between two particles with dipoles $p_A$ and $p_B$ is proportional to $p_A p_B (1-3\cos^2\theta)$, with $\theta$ being the angle between the direction along the centers of two particles and the applied field. For a binary system, the chain formation is strongly dependent on the polarization capability of the particles relative to that of the surrounding medium. FIG. 5 illustrates the relative position of two linear chains. In FIG. 5(a), A and B particles have the same polarization direction. Thus, they will repel each other if they stay in a plane perpendicular to the electric field. The interaction becomes attractive if two particles shift relative to each other by d/2. The A and B particles are in separate planes perpendicular to the electric field. This configuration has lower energy. In FIG. 5(b), A and B particles have opposite polarization directions and the shown parallel configuration has lower energy.

Figure 6A:
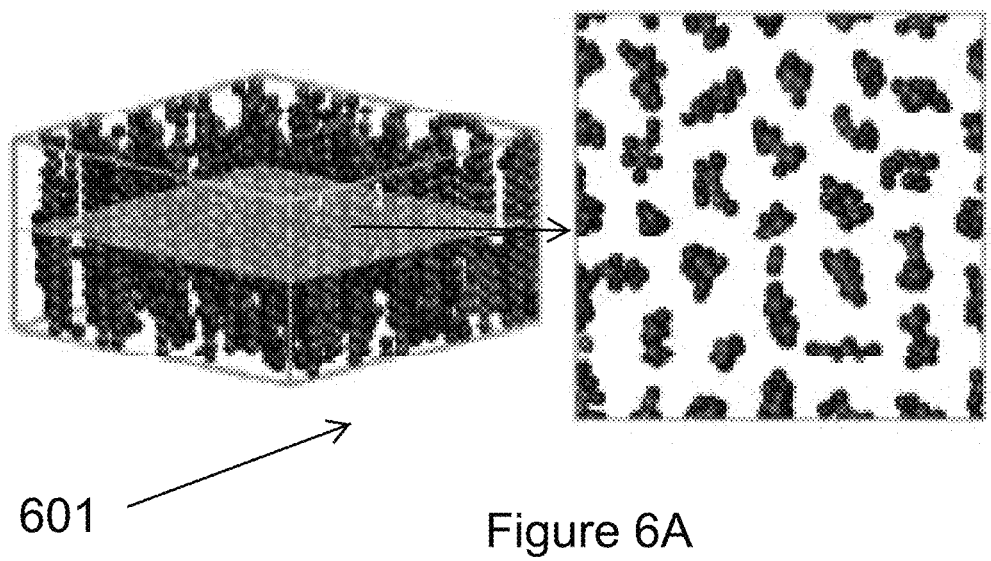
FIG. 6A shows a three-dimensional view (left) and a middle cross-sectional view (right) of a structure formed by A (light gray) particles and B (dark gray) particles. Both particles A and B are more polarizable than the medium. This leads to isolated columns with a core-shell configuration and thus gradient properties from inside to outside.
Figure 6B:
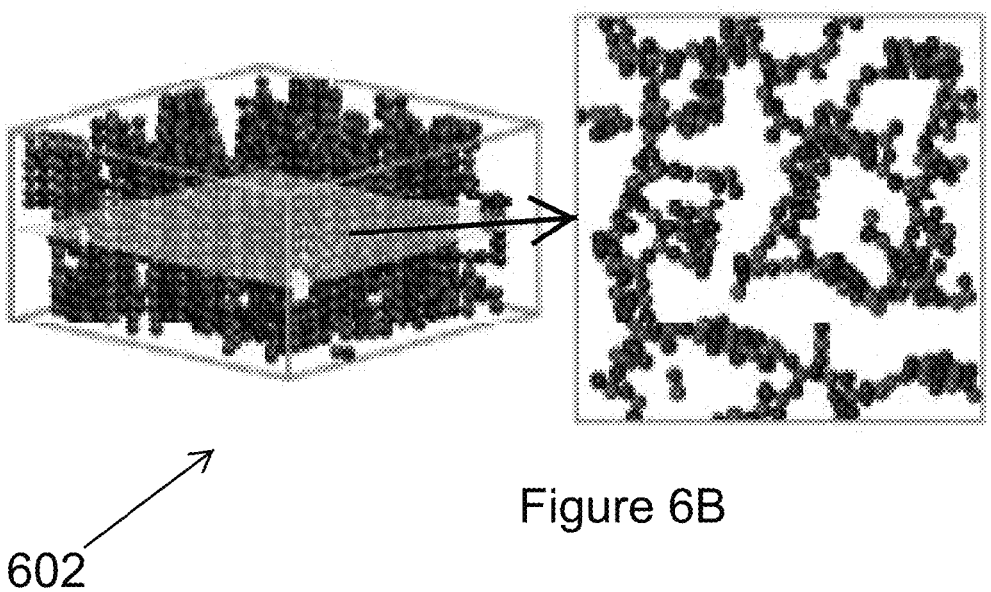
FIG. 6B shows a three-dimensional view (left) and a middle cross-sectional view (right) of a structure formed by A (light gray) particles and B (dark gray) particles. Particle A is more polarizable than the medium, while particle B is less polarizable than the medium. The system forms highly alternating A and B chains.
Figure 6C:
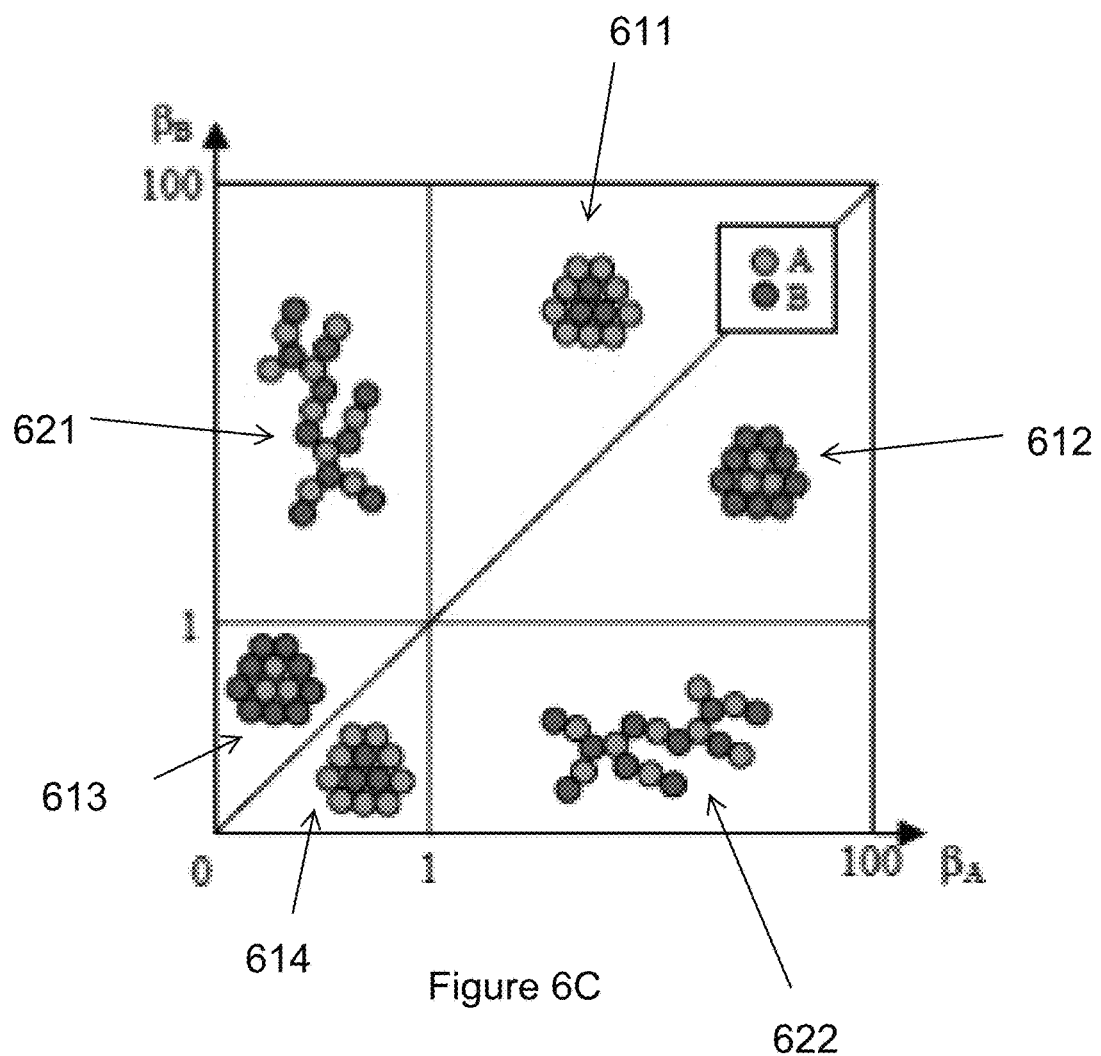
FIG. 6C shows a phase diagram in the parameter space of $\beta_A$ and $\beta_B$ for structures formed by A (light gray) particles and B (dark gray) particles, wherein one defines the permittivity ratios of the A and B particles to that of the medium by $\beta_A = \epsilon_A/\epsilon_m$ and $\beta_B = \epsilon_B/\epsilon_m$. Middle cross-sectional views similar to FIG. 6A (right) and FIG. 6B (right) are shown on the phase diagram.

Simulation results are shown in FIGS. 6A, 6B, and 6C. FIG. 6A shows a three-dimensional view (left) and a middle cross-section view (right) of a structure 601 formed by A (light gray) particles and B (dark gray) particles. Both particles A and B are more polarizable than the medium. The particles assemble into isolated columns with a core-shell configuration. The core is composed of the more polarizable A particles, while the shell is composed of the less polarizable B particles. From an energetic point of view, the attraction between two A chains is stronger than that between the A and B chains. As a result, the A chains aggregate to form A columns. The B chains tend to get as close to the A columns as possible, leading to the formation of B shells. This self-organized functionally gradient structure offers a gradual transition of the permittivity from the core to that of the medium. This approach is useful to construct functional gradient nanocomposites. At higher volume fractions of particles, the columns of structure 601 will become connective in the plane of the middle cross-sectional view.

FIG. 6B shows a three-dimensional view (left) and a middle cross-section view (right) of a structure 602 formed by A (light gray) particles and B (dark gray) particles. Particle A is more polarizable than the medium, while particle B is less polarizable than the medium. The particles also form pure chains along the field direction. A distinct feature in FIG. 6B is that the A and B chains are highly dispersed and form a network of alternating A and B particles in the x-y plane. This morphology is in contrast to that in FIG. 6A, where the same type of chains aggregate. The opposite dipole directions cause A and B particles to attract each other in the x-y plane. Same type of particles repel each other leading to a dispersed alternating chain distribution.

FIG. 6C shows a phase diagram in the parameter space of $\beta_A$ and $\beta_B$ for structures formed by A (light gray) particles and B (dark gray) particles. Simulations of different combinations of $\beta_A$ and $\beta_B$ lead to the phase diagram in FIG. 6C, which shows the cross-sectional view of different nanostructures. These bulk structures are three dimensional and extend along the electric field direction. In Region 611, $\beta_B > \beta_A > 1$ thereby forming a core of B particles and a shell of A particles. In region 612, $\beta_A > \beta_B > 1$ thereby forming a core of A particles and a shell of B particles. In region 613, $1 > \beta_A > \beta_B$ thereby forming a core of A particles and a shell of B particles. In region 614, $1 > \beta_B > \beta_A$ thereby forming a core of B particles and a shell of A particles. In region 621, $\beta_A > 1$ and $\beta_B > 1$ thereby forming a network of alternating A and B particles in the plane. In region 622, $\beta_A > 1$ and $\beta_B < 1$ thereby forming a network of alternating A and B particles in the plane.

Thus, Example 3 illustrates example structures of the present invention. For example, the A particles of the example structures of Example 3 could be the active material particles or the conductive additive particles of the present invention. Likewise, the B particles of the example structures of Example 3 could be the active material particles or the conductive additive particles of the present invention. Example 3 presents non-limiting illustrations of: (i) linear structures of the A and B particles along with the direction of the electric field (see FIG. 5); (ii) column structures of the A and B particles with a core-shell configuration (see FIG. 6A and regions 611, 612, 613, 614 of FIG. 6C); and (iii) aggregated chain structures of alternating A and B particles (see FIG. 6B and regions 621, 622 of FIG. 6C).

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for producing an electrochemical device, the method comprising:
   (a) placing a slurry comprising first active material particles comprising a first active material and second active material particles comprising a second active material on a metallic surface to form a slurry layer;
   (b) applying an electric field to the slurry layer on the metallic surface wherein a dipole moment of the first active material particles and a dipole moment of the second active material particles are induced such that the first active material particles and the second active material particles are oriented to form a structure along with a direction of the electric field; and
   (c) removing the electric field such that the structure remains stable to form the electrochemical device, wherein the first active material and the second active material are selected from the group consisting of lithium cobalt oxide, lithium iron phosphate, lithium manganese oxide, lithium nickel manganese cobalt oxide, lithium nickel cobalt aluminum oxide, lithium titanate, lithium vanadium oxide, lithium iron fluorophosphates, and lithium-containing layered compounds having hexagonal symmetry based on α-NaFeO$_2$ structure with a space group of R3$^{-m}$, and wherein the second active material is different from the first active material, wherein step (b) comprises forming a plurality of binary structures of the first active material particles and the second active material particles along the direction of the electric field, at least some of the plurality of binary structures including a core of one of the first active material particles and the second active material particles and a shell of the other of the first active material particles and the second active material particles, wherein the slurry comprises a solvent, and wherein the first active material particles are more polarizable than the solvent, and wherein the second active material particles are more polarizable than the solvent.

2. A method for producing an electrochemical device, the method comprising:

(a) placing a slurry comprising first active material particles comprising a first active material and second active material particles comprising a second active material on a metallic surface to form a slurry layer;

(b) applying an electric field to the slurry layer on the metallic surface wherein a dipole moment of the first active material particles and a dipole moment of the second active material particles are induced such that the first active material particles and the second active material particles are oriented to form a structure along with a direction of the electric field; and (c) removing the electric field such that the structure remains stable to form the electrochemical device, wherein the first active material and the second active material are selected from the group consisting of lithium cobalt oxide, lithium iron phosphate, lithium manganese oxide, lithium nickel manganese cobalt oxide, lithium nickel cobalt aluminum oxide, lithium titanate, lithium vanadium oxide, lithium iron fluorophosphates, and lithium-containing layered compounds having hexagonal symmetry based on α-NaFeO$_2$ structure with a space group of R3$^-$m, and wherein the second active material is different from the first active material, wherein step (b) comprises forming a plurality of binary structures of the first active material particles and the second active material particles along the direction of the electric field, at least some of the plurality of binary structures including alternating first active material particles and second active material particles, wherein the slurry comprises a solvent, and wherein one of the first active material particles and the second active material particles are more polarizable than the solvent, and wherein the other of the first active material particles and the second active material particles are less polarizable than the solvent.

3. The method of claim 1 wherein:

the first active material comprises nanoparticles or microparticles, and the second active material comprises nanoparticles or microparticles.

4. The method of claim 3 wherein:

the slurry further comprises a binder selected from the group consisting of polytetrafluoroethylene, polyvinylidene fluoride, cellulose, polyvinyl alcohol, carboxymethylcellulose, starch, hydroxypropylcellulose, regenerated cellulose, polyvinyl pyrollidone, tetrafluoroethylene, polyethylene, polypropylene, ethylene-propylene-diene terpolymers, sulfonated ethylene-propylene-diene terpolymers, styrene butadiene rubbers, fluoro-rubbers, copolymers, polymer-saponified polyvinyl alcohol, and mixtures thereof.

5. The method of claim 2 wherein:

the slurry further comprises a binder selected from the group consisting of polytetrafluoroethylene, polyvinylidene fluoride, cellulose, polyvinyl alcohol, carboxymethylcellulose, starch, hydroxypropylcellulose, regenerated cellulose, polyvinyl pyrollidone, tetrafluoroethylene, polyethylene, polypropylene, ethylene-propylene-diene terpolymers, sulfonated ethylene-propylene-diene terpolymers, styrene butadiene rubbers, fluoro-rubbers, copolymers, polymer-saponified polyvinyl alcohol, and mixtures thereof.

6. The method of claim 2 wherein:

step (b) comprises forming a network of alternating first active material particles and second active material particles in a plane perpendicular to the direction of the electric field.

7. The method of claim 2 wherein:

the first active material comprises nanoparticles or microparticles, and the second active material comprises nanoparticles or microparticles.

* * * * *